United States Patent

Los

[15] 3,676,440
[45] July 11, 1972

[54] ISOCYANURATE-CONTAINING POLYTHIOLS

[72] Inventor: Lenore J. Los, Greenbelt, Md.
[73] Assignee: W. R. Grace & Co., New York, N.Y.
[22] Filed: Feb. 26, 1970
[21] Appl. No.: 14,676

[52] U.S. Cl. .................................260/248 NS, 260/94.4
[51] Int. Cl. .......................................................C07d 55/38
[58] Field of Search ..............................................260/248 NS

[56] References Cited

UNITED STATES PATENTS 3,538,092  11/1970  Dexter ..................................260/248
3,293,248  12/1966  Sheffer .................................260/248

Primary Examiner—John M. Ford
Attorney—Richard P. Plunkett and Kenneth E. Prince

[57] ABSTRACT

This invention describes compounds of high polarity which are useful as curing agents in curable liquid polymer systems containing polyenes and a free-radical initiator. Each of these polar compounds comprises the isocyanurate group as a central nucleus and bears substituents attached thereto at least two of which must contain a thiol group. In this class of compounds, the preferred members are isocyanurate-containing trithiols having the generalized structure as follows:

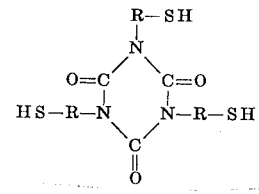

wherein R is an organic divalent moiety.

9 Claims, No Drawings

ISOCYANURATE-CONTAINING POLYTHIOLS

This invention relates to novel isocyanurate-containing polythiols which are useful as curing agents in curable liquid polymer systems containing polyenes and a free-radical initiator. Each of these polar compounds comprises the isocyanurate group as a central nucleus and bears substituents attached thereto at least two of which must contain a thiol group.

Cyanuric acid exists in two forms differing by the location of the three hydrogen atoms. In equilibrium, the two forms may be represented as follows:

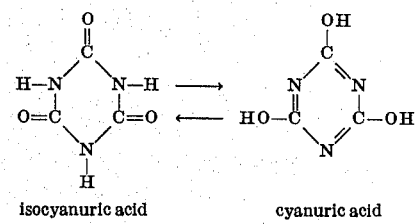

isocyanuric acid  cyanuric acid

As indicated infra, cyanuric acid reacts with many reagents to form N-derivatives of the acid, i.e., isocyanurates. Support for the formation of the isocyanurate structure is found in the major infared absorption spectra peaks of the products which show the presence of carbonyl triazine ring groups. Moreover, caustic fusion of the products forms mono primary amines, pointing to the N- linkage of the substituent groups.

The preferred isocyanurate-containing polythiols of this invention may be represented graphically by the following general formula:

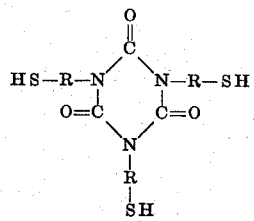

wherein R represents a divalent organic moiety selected from the group consisting of

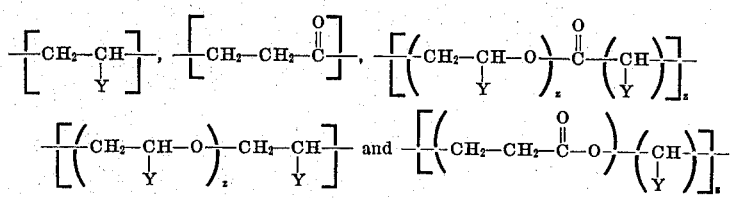

where Y is hydrogen, methyl or ethyl and z is an integer from 0 to 10.

The methods of synthesis of the products of this invention involve the reaction of isocyanuric acid or an N-substituted derivative of isocyanuric acid with an appropriate sulfur-containing reagent. For example, a hydroxy-substituted derivative such as tris (hydroxyethyl) isocyanurate can be esterified with 3-mercaptopropionic acid to yield the corresponding trithiol, namely, tris (3-mercaptopropionate) ester of tris hydroxyethyl) isocyanurate. Since this is one of the preferred polythiol compounds of the present invention, the equation for this reaction is shown here and is presented as being generally exemplary of the processes and products of this invention:

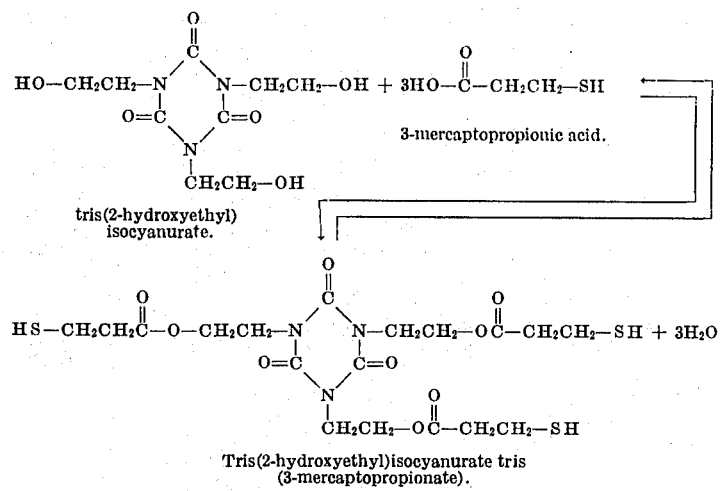

The reaction is reversible, as indicated in the equation above. During the production of the trithiol product, the water generated is removed from the reaction vessel by azeotropic distillation with toluene or other inert solvent which is present in the reaction mixture. This allows the reaction to proceed to form an essentially quantitative yield of the desired product. Usually a slight to moderate excess of 3-mercaptopropionic acid is used in order to speed up the rate of the reaction. Esterification catalysts such as para-toluenesulfonic acid, stannous octoate and the like may be used if desired although their use is not mandatory.

Obviously, the components used in these reactions can vary widely in their actual structure. For example, in the example presently under discussion, the 3-mercaptopropionic acid can be replaced by any other mercapto acid, .eg., 2-mercaptoacetic acid; 2-mercaptopropionic acid; 11-mercaptoundecanoic acid, etc. The tris (2-hydroxyethyl) isocyanurate could be replaced by tris(2-hydroxypropyl) isocyanurate; tris(2-hydroxyethoxyethyl)isocyanurate. Further, as shown by the examples, below, considerable departure from the esterification reactions just described is also possible without departing from the spirit of the invention.

The following examples will help to explain but expressly not limit the instant invention. Unless otherwise noted all parts and percentages are by weight.

EXAMPLE 1

1 mole of tris ( 2-hydroxyethyl) isocyanurate, 4.5 moles of 3-mercapto-propionic acid and 100 milliliters toluene are charged to a 1 liter three neck round bottom flask equipped with stirrer, heating mantle, thermometer and condenser — Dean Stark trap. The reaction was carried rut for 7 hours at a temperature of about 130° C during which time water was continuously removed in the Dean Stark trap. The extent of the reaction was calculated either from the amount of water removed or by titrating the acid value. The reaction mixture was poured into a separatory funnel and water was added. Washing with water was continued until the pH of the wash water was neutral. The toluene layer containing the product was filtered through magnesium sulfate and thereafter the toluene was stripped off at 70° C under a reduced pressure of 20 mm in a rotating evaporator. The yield of the tris (3-mercaptopropionate) ester of tris (2-hydroxyethyl) isocyanurate i.e.,

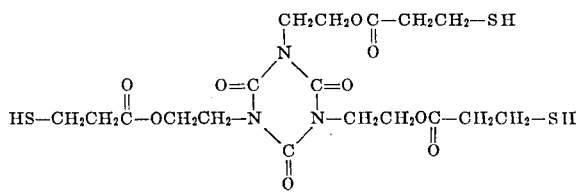

was in excess of 90%.

EXAMPLE 2

1 mole of tris (2-hydroxyethyl)isocyanurate, and 3 moles $SOCl_2$ are placed in a three-neck round bottom flask equipped with stirrer, thermometer and condenser. The mixture is stirred and heated at 60° C for 1 hour and then refluxed for 4 hours. The hot mixture was poured into ice water, washed with dilute $NaHCO_3$ solution and then dried to recover the tris (2-chloroethyl)isocyanurate product. 1 mole of tris (2-chloroethyl)isocyanurate and 3 moles of $Na_2CS_3$ (in 33 percent $H_2O$ solution) are slowly brought to reflux and kept so for about 5 hours. The flask is cooled and an equivalent of $H_2SO_4$ is slowly dropped in. The layers are separated, the product layer is washed first in dilute $NaHCO_3$, then with water and finally dried to obtain the tris (2-mercaptoethyl) isocyanurate product i.e.,

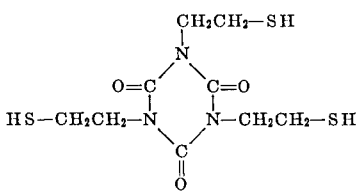

in good yield.

EXAMPLE 3

1 mole of tris (2-hydroxyethyl)isocyanurate is charged to a 1 liter 4 neck round bottom flask equipped with air stirrer, thermometer, condenser and dropping funnel and containing 350 ml benzene. 2 moles of ethylene sulfide are placed in the dropping funnel and the rate of addition adjusted so that the temperature of the reaction maintains a good reflux. A catalytic amount of 3.4 g. of para-toluene sulfonic acid is added to catalyze the reaction. The reaction was allowed to proceed at a refluxing temperature of about 80°C for 5 hours. The reaction was cooled, washed with $NaHCO_3$ to remove unreacted acid, then washed with water and dried. After stripping off the benzene, the product was identified as primarily tris (2-mercaptoethoxyethyl) isocyanurate, i.e.,

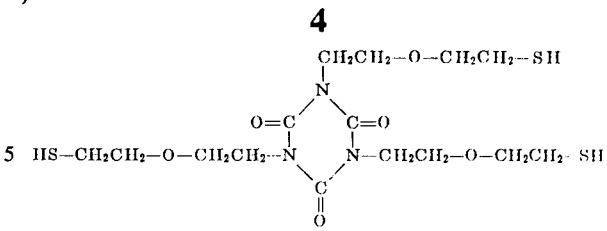

EXAMPLE 4

1 mole of tris (2-carboxyethyl)isocyanurate and 3 moles of phthaloyl chloride are charged to a 1 liter 3 neck flask equipped with stirrer, heating mantle, condenser and thermometer. The reaction was carried out with stirring for 6 hours at 140° C. Phthalic anhydride needles sublimed on the sides of the flask and the reaction mixture became dark in color. The product was fractionally crystallized from ether. 1 mole of the resultant product and 3 moles of NaSH are charged to a similarly equipped round bottom flask and refluxed in an equal volume of tetrahydrofuran for about 7 hours. The product was washed with water, separated, dried and filtered and thereafter recrystallized from benzene. The resultant product, tris(2-thiocarboxyethyl)isocyanurate, i.e.,

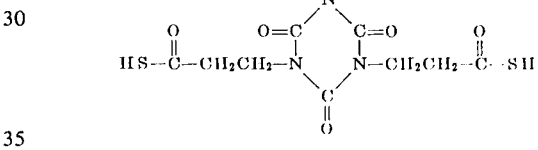

was obtained in good yield.

EXAMPLE 5

1 mole of tris(2-carboxyethyl)isocyanurate, 4 moles of 2-mercaptoethanol and 100 ml toluene were charged to a 1 liter 3 neck round bottom flask equipped with stirrer, heating mantle, thermometer and condenser—Dean Stark trap. The reaction was carried out at a temperature of about 140° C for 8 hours during which time water was continuously removed in the Dean Stark trap. The reaction mixture was worked up as in Example 1 to recover the isomer product mixture, which was predominantly tris(2-mercaptoethyl) ester of tris(2-carboxyethyl)isocyanurate, i.e.,

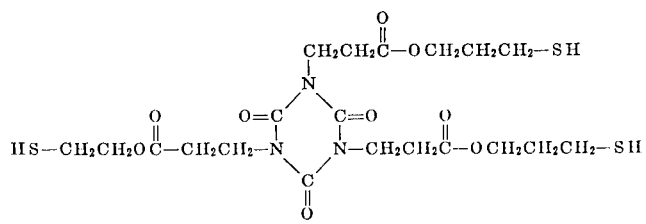

The following example shows the use of the novel polythiols of the instant invention as curing agents in curable liquid polymer systems containing polyenes and a free-radical initiator.

EXAMPLE 6

1 mole diglycidyl ether of Bisphenol A having a molecular weight in the range 370–384 and commercially available from Shell Chemical Company under the tradename "Epon 828" and 2 moles of diallyl amine were charged to a beaker at room temperature (25° C). The reaction was continued for 18 hours with stirring during which time the exotherm and reaction temperature was maintained below 80° C. 1.5 moles of the thus formed allyl terminated liquid prepolymer was admixed with 2 moles of tris (2-hydroxyethyl) isocyanurate tris (3-mercaptopropionate) and 1.5 g. benzophenone in an aluminum dish to form a photocurable composition. The photocurable composition was exposed to a 275 watt RS sun lamp at a surface intensity of 4,000 microwatts/cm² for 8 minutes. The thus cured composition was hardened to a solid.

EXAMPLE 7

Example 1 was repeated except that 4.5 mole 11-mercaptoundecanoic acid was used as a reactant instead of 3-mercaptopropionic acid. A good yield of tris(11-mercaptoundecanoate) ester of tris (2-hydroxyethyl)isocyanurate, i.e.,

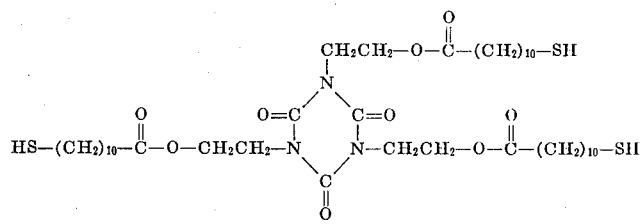

was obtained.

EXAMPLE 8

Example 1 was repeated except that 1 mole of tris (2-hydroxypropyl) isocyanurate was substituted for the 1 mole of tris (2-hydroxyethyl) isocyanurate. The tris (3-mercaptopropionate) ester of tris (2-hydroxypropyl) isocyanurate product, i.e.,

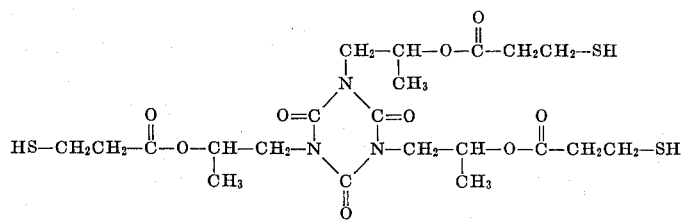

was obtained in good yield.

EXAMPLE 9

Example 1 was repeated except that 4.5 moles of 2-mercaptopropionic acid was substituted for the 3-mercaptopropionic acid. The tris (2-mercaptopropionate) ester of tris (2-hydroxyethyl) isocyanurate product, i.e.,

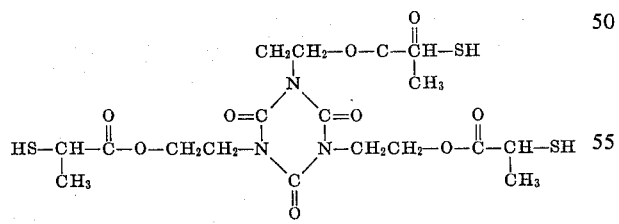

was obtained in good yield.

The reaction temperature utilized to form the trithiols of the instant invention is in the range 60°–200° C with the ester-forming reactions being performed preferably in the range 100°–200° C.

The novel trithiols of the instant invention can be used in curing liquid polyenes in the presence of a free-radical generator, e.g. U.V. light to form cured polythioether products having many and varied uses. Examples of some uses include but are not limited to adhesives; caulks; elastomeric sealants; coatings; encapsulating or potting compounds; liquid castable elastomers; thermoset resins; impregnants for fabric, cloth, fibrous webs and other porous substrates; laminating adhesives and coatings; mastics; glazing compounds; fiberglas reinforced composites; sizing or surface finishing agents, filleting compounds; cure in place gasketing compounds; rocket fuel binders; foamable thermosetting resins or elastomers; molded articles such as gaskets, diaphragms, balloons, automobile tires, photoresists, photocurable printing plates, etc. The novel isocyanurate-containing polythiols of the present invention, because of the increased polarity of the isocyanurate nucleus, form cured polythioethers having greatly improved performance characteristics such as higher tensile strength, greater elongation, improved adhesiveness to substrates, and the like.

What is claimed is:

1. An isocyanurate-containing trithiol of the formula:

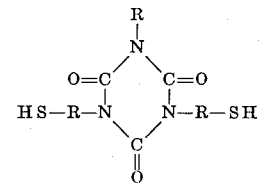

wherein R is an organic divalent moiety member of the group consisting of

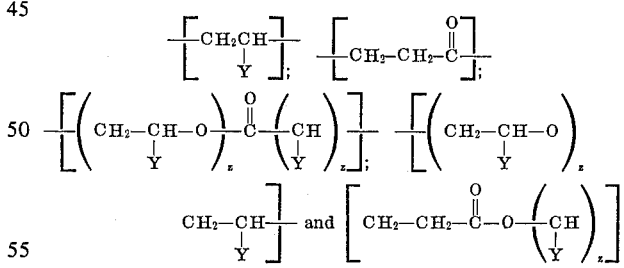

wherein the total number of carbon atoms in R is not greater than 13, Y is a member of the group consisting of hydrogen, methyl and ethyl and z is an integer from 0–10.

2. A trithiol according to claim 1 comprising tris (3-mercaptopropionate) ester of tris (2-hydroxyethyl) isocyanurate.

3. A trithiol according to claim 1 comprising tris (2-mercaptoethyl) isocyanurate.

4. A trithiol according to claim 1 comprising tris (2-mercaptoethoxyethyl)isocyanurate.

5. A trithiol according to claim 1 comprising tris (2-thiocarboxyethyl)isocyanurate.

6. A trithiol according to claim 1 comprising tris (2-mercaptoethyl)ester of tris(2-carboxyethyl)isocyanurate.

7. A trithiol according to claim 1 comprising tris (11-mercaptoundecanoate) ester of tris (2-hydroxyethyl) isocyanurate.

8. A trithiol according to claim 1 comprising tris (3-mercaptopropionate) ester of tris (2-hydroxypropyl) isocyanurate.

9. A trithiol according to claim 1 comprising tris (2-mercaptopropionate) ester of tris (2-hydroxyethyl) isocyanurate.

* * * * *

UNITED STATES PATENT OFFICE
CERTIFICATE OF CORRECTION

Patent No. 3,676,440       Dated July 11, 1972

Inventor(s) Lenore J. Los

It is certified that error appears in the above-identified patent and that said Letters Patent are hereby corrected as shown below:

In Claim 1, column 6, between lines 12 and 42, the formula should be

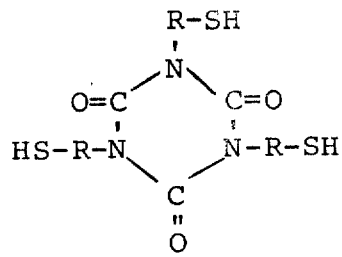

Signed and sealed this 31st day of October 1972.

(SEAL)
Attest:

EDWARD M. FLETCHER, JR.         ROBERT GOTTSCHALK
Attesting Officer               Commissioner of Patents